United States Patent
Li et al.

(10) Patent No.: US 11,201,473 B1
(45) Date of Patent: Dec. 14, 2021

(54) COORDINATED CONTROL SYSTEM AND METHOD OF WIND TURBINE AND STATCOM FOR SUPPRESSING UNBALANCED VOLTAGE IN DISPERSED WIND FARM

(71) Applicant: Hunan University, Hunan (CN)

(72) Inventors: Yong Li, Hunan (CN); Yanjian Peng, Hunan (CN); Yijia Cao, Hunan (CN); Longfu Luo, Hunan (CN); Shaoyang Wang, Changsha Hunan (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 16/931,437

(22) Filed: Jul. 16, 2020

Related U.S. Application Data

(63) Continuation of application No. PCT/CN2020/096967, filed on Jun. 19, 2020.

(51) Int. Cl.
*H02J 3/38* (2006.01)
*H02J 3/18* (2006.01)
*G05B 19/042* (2006.01)

(52) U.S. Cl.
CPC ............ *H02J 3/381* (2013.01); *G05B 19/042* (2013.01); *H02J 3/18* (2013.01); *G05B 2219/2619* (2013.01); *H02J 2300/28* (2020.01)

(58) Field of Classification Search
CPC .......... H02J 3/381; H02J 3/18; H02J 2300/28; G05B 19/042; G05B 2219/2619
See application file for complete search history.

(56) References Cited

U.S. PATENT DOCUMENTS

| | | | |
|---|---|---|---|
| 2012/0087158 A1* | 4/2012 | Chapman | H02J 3/44 363/37 |
| 2012/0203385 A1* | 8/2012 | Kumar | H02J 3/472 700/287 |

(Continued)

FOREIGN PATENT DOCUMENTS

| | | |
|---|---|---|
| CN | 102822508 A | 12/2012 |
| CN | 109546667 A | 3/2019 |

OTHER PUBLICATIONS

International search report of PCT Patent Application No. PCT/CN2020/096967 dated Mar. 24, 2021.

*Primary Examiner* — Thomas C Lee
*Assistant Examiner* — Charles Cai

(57) ABSTRACT

The disclosure discloses a system and method for suppressing unbalanced voltage at the Point of Common Coupling (PCC) of dispersed wind farm. According to the disclosure, the wind farm comprising a STATCOM and plurality of wind turbines, dispersed wind farm controller, STATCOM controller, wind turbine controller. The dispersed wind farm controller decides that whether the STATCOM or the wind turbines inject negative-sequence current or not. Adaptive virtual negative-sequence output admittance controller is incorporated into the STATCOM controller and wind turbine controller, which can provide the negative-sequence current reference according to their participation factor. The compensation efforts of STATCOM and wind turbines can be flexibly controlled by changing their participation factor, which is related to the voltage unbalance voltage reference and the remaining capacity. The disclosure has significant advantages in cost and effectiveness to suppress the unbalanced voltage of PCC and improve the wind farm Low voltage fault recovery capability.

12 Claims, 10 Drawing Sheets

(56) References Cited

U.S. PATENT DOCUMENTS

| | | | |
|---|---|---|---|
| 2012/0306277 A1* | 12/2012 | Garcia | H02J 3/1885 |
| | | | 307/82 |
| 2014/0085944 A1* | 3/2014 | Lee | H02J 3/383 |
| | | | 363/37 |
| 2016/0197482 A1 | 7/2016 | Varma et al. | |
| 2017/0025858 A1* | 1/2017 | Garcia | H02J 3/46 |
| 2017/0250540 A1 | 8/2017 | Varma | |
| 2018/0269682 A1* | 9/2018 | Specht | H05K 7/20236 |
| 2019/0346509 A1* | 11/2019 | Sarwar | G01R 31/346 |
| 2021/0173423 A1* | 6/2021 | Rosso | H02M 7/44 |

* cited by examiner

COORDINATED CONTROL SYSTEM AND METHOD OF WIND TURBINE AND STATCOM FOR SUPPRESSING UNBALANCED VOLTAGE IN DISPERSED WIND FARM

CROSS REFERENCE TO RELATED APPLICATIONS

The present application is a Continuation Application of PCT Application No. PCT/CN2020/096967 filed on Jun. 19, 2020, the contents of which are incorporated herein by reference in their entirety.

FIELD OF THE INVENTION

The present invention generally relates to a wind farm. More particularly, it relates to a method to suppress the unbalanced voltage at the Point of Common Coupling of wind farm.

BACKGROUND OF THE INVENTION

Wind generation grows rapidly around the world due to its merits such as economic, environmental and technological issues. The curtailment of power is a common phenomenon in the large-scale centralized wind farms because the export and local consumption problems cannot be solved completely, especially in Northwest, Northern, and Northeast China. Recently, several policies are released to encourage the development of DWF in China, because the DWF can achieve the balancing and consumption of the electricity locally compared to the large-scale centralized wind farm. Generally, most DWFs are built in the remote area (i.e., the end of regional grid) owing to the limitation of the topographical and wind resources conditions. Therefore, the wind power from DWF should be transferred to the load centers via a relatively long transmission line, which makes the grid weak. The short-circuit ratio (SCR) is defined by short-circuit capacity over installed capacity of wind farm, always used to describes the strength of the grid.

A grid connection can be regarded as weak when SCR is less than 3, and very weak when SCR is less than 2. In a weak grid, the voltage unbalance phenomenon often occurs due to various grid faults or variation of unbalance and impact loads, such as high-speed train.

The voltage at the point of common coupling (PCC) of DWF can be kept stable, because the doubly fed induction generator (DFIG) and permanent magnetic synchronous generator (PMSG) can regulate reactive power independently by controlling inverter. In other words, the DWF with DFIG or PMSG has the low-voltage ride through ability, which can meet the grid code. A static synchronous compensator (STATCOM) is a standard configuration in the DWF because it can provide dynamic reactive power to support the voltage at the PCC in a short time. In fact, it is necessary to configure the STATCOM for the DWF especially in an unbalanced grid or a fault condition.

Recently, the cascaded H-bridges (CHB) STATCOM has been used in DWF because of its large-capacity, high-voltage and few harmonic currents. For the CHB-STAT-COM, the dc capacitor voltages of three-phase clusters become unbalanced when it is required to inject the negative-sequence current because the negative-sequence current can lead to unequal distribution of active power among three-phase clusters. Such phenomenon will result in over-modulation problem and make the system unstable. To address this problem, the zero-sequence voltage injecting and the third harmonic voltage injecting methods were studied. All of the mentioned methods can redistribute the active power of three-phase clusters; thus, the dc capacitor of three-phase clusters can be balanced effectively.

Many literatures focus on using the compensation capability of renewable energy to suppress the unbalanced grid voltage because the remaining capacity of inverter can be utilized. However, the coordinated control of different inverters for suppressing unbalanced grid voltage is not considered in these literatures. It is necessary to consider the unbalanced compensation effort sharing for different inverters because the spare capacity of inverters is different if they operate at different conditions. For example, the inverters should inject more negative-sequence currents when they have more remaining capacity, while they should inject less negative-sequence currents when they have less remaining capacity.

SUMMARY OF THE INVENTION

To fully utilize the negative-sequence current injection capability of STATCOM, this invention provides a coordinated control strategy of PMSGs and STATCOM based virtual negative-sequence output admittance (NSOA). Noting that STATCOM will inject negative-sequence currents immediately if there is exists unbalanced voltage at the PCC, a zero-sequence voltage injecting method is used to keep the dc capacitor voltage balance among three-phase clusters of STATCOM. If the unbalanced grid voltage cannot be fully suppressed by STATCOM, the PMSGs will share the remaining unbalanced voltage until the power quality of PCC to meet the grid code.

The present invention provides an unbalanced voltage compensation method for dispersed wind farm (DWF) by cooperating permanent magnetic synchronous generator (PMSG) with a star-connected cascaded H-bridge STATCOM. The topology of a typical DWF is given and the mathematical models of STATCOM and PMSGs are established to show that the unbalanced grid voltage can be suppressed by controlling the NSOA of PMSG and STATCOM. As mentioned above, if there is exists unbalanced voltage at the PCC, the STATCOM will inject negative-sequence currents immediately. In order to make the STATCOM work stable even if it injects a mount of negative-sequence currents, the over-modulation and over-current limitations are introduced to quantitatively analyze the negative-sequence current injection ability of the STATCOM.

If the unbalanced grid voltage cannot be fully suppressed by STATCOM even if it injects the maximum negative-sequence current, the PMSGs will share the remaining unbalanced voltage according to their NSOA. The participation factors of PSMGs based on a secondary control strategy are designed, thus their NSOA can be changed by controlling the participation factor. Furthermore, the participation factor calculation method is also proposed in consideration of both remaining capacity and voltage unbalanced factor (VUF) for different PMSGs.

DETAILED DESCRIPTION OF THE PREFERRED EMBODIMENT

In the following description, the control method of STATCOM and PMSGs thereof and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without under undue experimentation.

Topology of a Dispersed Wind Farm

Figure 1:
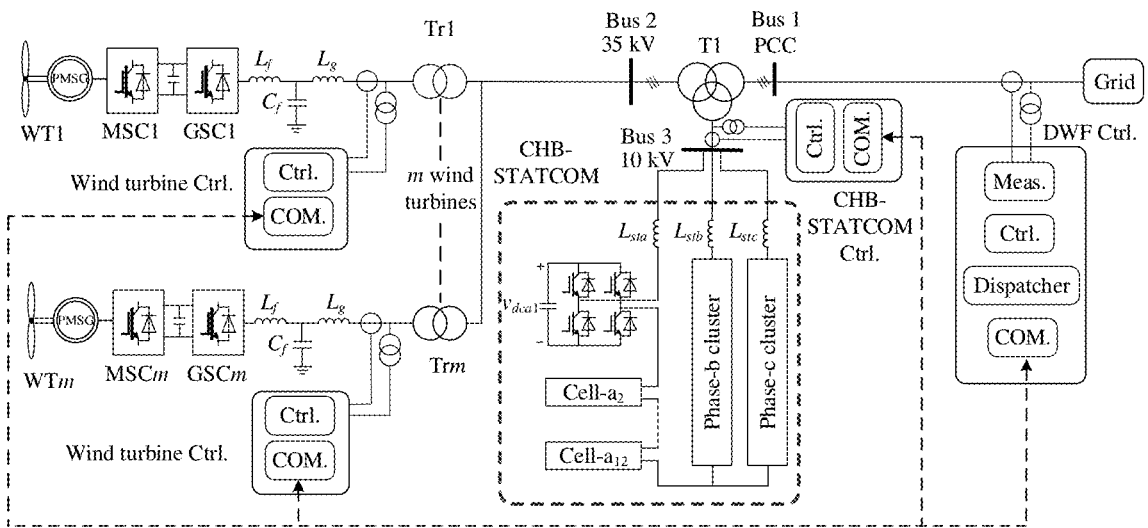
FIG. 1 shows a dispersed wind farm, which contains m PMSGs and a STATCOM in accordance to an embodiment of the present invention.

FIG. 1 shows a dispersed wind farm, which contains m wind turbines and a STATCOM. Generally, a dispersed wind farm is composed of 25 wind turbines with a rating of 2.0 MW each, with the total installed capacity of 50 MW, so in FIG. 1, m=25. Here, the capacity of STATCOM is ±5 MVar. Referring now to FIG. 1, a DWF controller is required to control the characteristic of the negative-sequence at the PCC. Therefore, a centralized dispersed wind farm controller (DWF Ctrl.) is need to supervise the negative-sequence voltage and current injected at the PCC. The DWF controller is formed by the measurement device (Meas.), which contains the voltage and current sense at the PCC, a dispatcher and a communication hub (COM.). The communication hub will exchange control reference and other signals with all the wind turbines (Wind turbine Ctrl.) and STATCOM (STATCOM Ctrl.).

Still referring to FIG. 1, the dispatcher of DWF controller has the functionality of calculating the participation factors of STATCOM and wind turbines. The way of calculating the participation factor can be done by the following strategies, e.g. minimization of VUF at the PCC. The strategy suggested in view of the present invention is based on using STATCOM and wind turbine as the back-up for the wind farm in case there exist unbalanced grid that exceeds the limit value at the PCC. The strategy also suggested in view of the present invention is based on the STATCOM should inject negative-sequence current immediately if there exist unbalanced grid at the PCC.

Still referring to FIG. 1, wind turbines are connected in parallel to the 35 kV bus via a box-type transformer and then connected to the public network through a grid-connected transformer with three windings. For the three-windings grid-connected transformer, literature proposes an inductive method for suppressing the harmonic in photovoltaic station. Specifically, the STATCOM and passive filter are connected to the tertiary winding of the three-winding transformer, owing to the impendences of tertiary winding and passive filter are equal to zero, the harmonics can be eliminated between the secondary winding and the tertiary winding. In this way, there are no or few harmonic currents at the grid winding of the transformer. Moreover, the traditional coupling transformer can be saved because the STATCOM can be connected to the tertiary winding of the three-winding transformer. In this invention, the passive filter is omitted because the STATCOM has a better dynamic reactive power compensation.

Still referring to FIG. 1, permanent magnetic synchronous generator (PMSG) is adopted in this invention.

Still referring to FIG. 1, cascaded H-bridges STATCOM (CHB-STATCOM) is adopted in this invention.

Modeling of PMSG's Grid-Side Inverter in Negative-Sequence Synchronous Reference Frame (NS-SRF)

Figure 2:
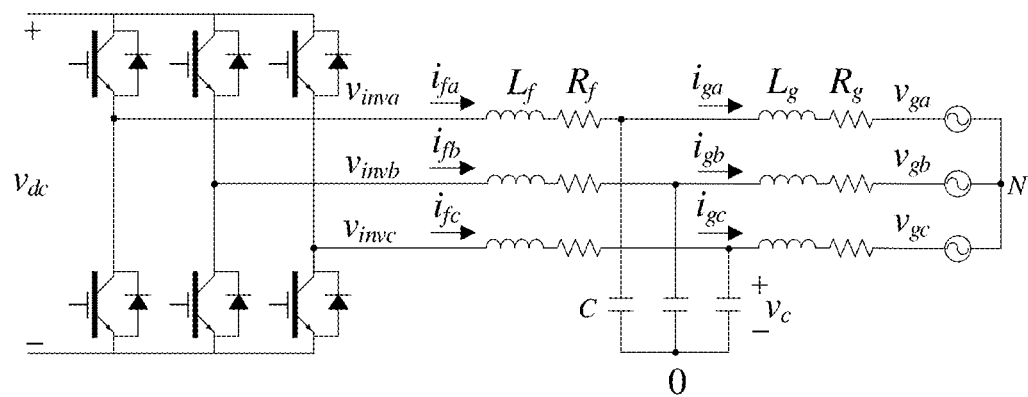
FIG. 2 shows the electrical schematic of the PMSG inverter with an LCL filter.

FIG. 2 shows a grid-side inverter of PMSG with an LCL filter. According to the Kirchhoff's current law (KCL) and the Kirchhoff's voltage law (KVL), the dynamics of grid-side inverter of PMSG with LCL filter in NS-SRF is obtained as, $$L_f \frac{di_{fdqn}}{dt} = -(R_f - j\omega_g L_f)i_{fdqn} - v_{cdqn} + v_{invdqn} \quad (1)$$

$$L_g \frac{di_{gdqn}}{dt} = -(R_g - j\omega_g L_g)i_{gdqn} + v_{cdqn} - v_{gdqn} \quad (2)$$

$$C \frac{dv_{cdqn}}{dt} = i_{fdqn} - i_{gdqn} + j\omega_g C v_{cdqn} \quad (3)$$

where $\omega_g$ is angular frequency of the grid; $R_f$, $L_f$, $R_g$, $L_g$ and C constitute of LCL filter; $i_{fdqn}$, $i_{gdqn}$ are the negative-sequence components of the grid current and the inverter output current, respectively; $v_{gdqn}$, $v_{invdqn}$, $v_{cdqn}$, are the negative-sequence components of grid voltage, inverter output voltage and capacitor voltage, respectively; In the steady state, the dx/dt=0, where x=$i_{fdqn}$, $i_{gdqn}$, $v_{cdqn}$. Therefore, the (1), (2) and (3) can be rewritten as, $$v_{cdqn} = (R_f - j\omega_g L_f)i_{fdqn} + v_{invdqn} \quad (4)$$

$$-(R_g - j\omega_g L_g)i_{gdqn} + v_{cdqn} - v_{gdqn} = 0 \quad (5)$$

$$i_{fdqn} = i_{gdqn} - j\omega_g C v_{cdqn} \quad (6)$$

Substituting (4) and (6) into (5), the negative-sequence current of PMSG can be expressed with negative-sequence output voltage of inverter and negative-sequence grid voltage as, $$Mi_{gdqn} = -v_{invdqn} + NV_{gdqn} \quad (7)$$

where, $$M = -(R_g - j\omega L_g) - (R_f - j\omega_g L_f) + (R_g - j\omega L_g)(R_f - j\omega_g L_f)j\omega_g C \quad (8)$$

$$N = 1 - (R_f - j\omega_g L_f)j\omega_g C \quad (9)$$

Thus, the NSOA of the PMSG can be obtained as $$Y_{gn} = \frac{i_{gdqn}}{v_{gdqn}} = \frac{N}{M} - \frac{1}{M}\frac{v_{invdqn}}{v_{gdqn}} \quad (10)$$

Therefore, we can see from (10) that the NSOA of PMSG can be controlled by changing the negative-sequence components of the grid-side inverter's output voltage.

Equivalent Model of CHB-STATCOM in NS-SRF

Figure 3:
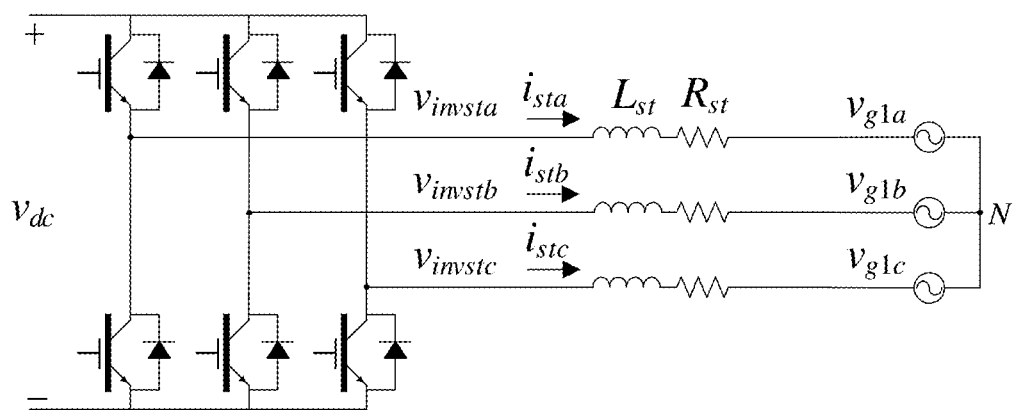
FIG. 3 shows the equivalent circuit of the STATCOM.

FIG. 3 shows an equivalent circuit of CHB-STATCOM, where the CHB-STATCOM is represented by a common converter. The negative-sequence components of CHB-STATCOM in the NS-SRF can be expressed as, $$L_{st}\frac{di_{stdqn}}{dt} = -(R_{st} - j\omega_g L_{st})i_{stdqn} + v_{stinvdqn} - v_{g1dqn} \quad (11)$$

where $R_{st}$ and $L_{st}$ are the resistance and inductance of the filter. $i_{stdqn}$ is the negative-sequence current, $v_{stinvdqn}$ is the negative-sequence component output voltage, $v_{g1dqn}$ is the voltage of the terminal connected with the CHB-STATCOM.

In the steady state, the left side of (11) is equal to 0. So, the NSOA of CHB-STATCOM can be obtained as $$Y_{stn} = \frac{i_{stdqn}}{v_{g1dqn}} = \frac{1}{(R_{st} - j\omega_g L_{st})} - \frac{1}{(R_{st} - j\omega_g L_{st})}\frac{v_{invdqn}}{v_{g1dqn}} \quad (12)$$

Similarly, we can see from (12) that the NSOA of the CHB-STATCOM can be controlled by changing its output voltage.

Modeling of Overall Wind Power Integration System

Figure 4:
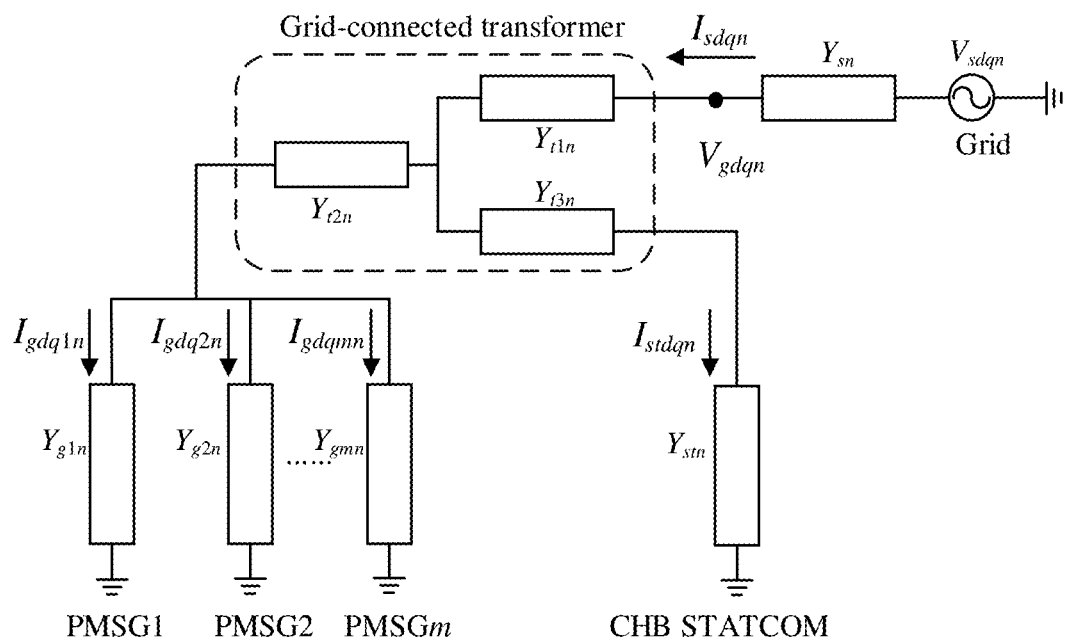
FIG. 4 shows the equivalent negative-sequence model of investigated dispersed wind farm.
Figure 5:
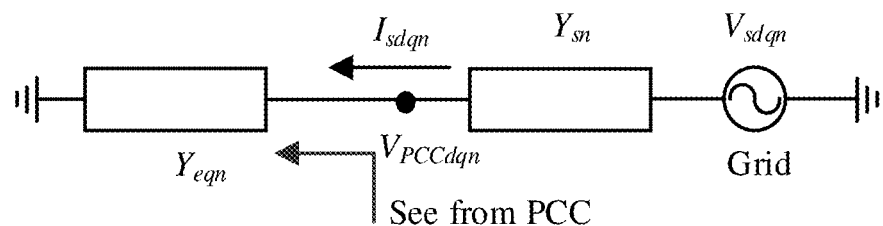
FIG. 5 shows the equivalent negative-sequence model of FIG. 4.

The negative-sequence model of overall wind power integration is established to analyze the coordinated mechanism for compensating unbalanced voltage of PCC, as shown in FIG. 4, in which the unbalanced grid is modeled as an unbalanced voltage $v_{sdqn}$ and a negative-sequence admittance $Y_{sn}$. The PMSG and the CHB-STATCOM are modeled as negative-sequence admittance $Y_{gxn}$ (x=1, 2, 3 ... m) and $Y_{stn}$, respectively. The grid-connected three-winding transformer is also modeled as negative-sequence admittance, specifically, $Y_{t1n}$, $Y_{t2n}$, $Y_{t3n}$ are the equivalent negative-sequence admittance of the primary-winding, the secondary winding, and the tertiary winding, respectively. Noting that the positive- and negative-sequence impedances of transformer are same. Furthermore, a simplified negative-sequence model of wind power integration system is obtained, as shown in FIG. 5, in which $Y_{eqn}$ is the equivalent negative-sequence admittance seen from PCC. According to the FIG. 4, $Y_{eqn}$ can be calculated as, $$Y_{eqn} = \cfrac{1}{\cfrac{1}{Y_{t1n}} + \cfrac{1}{\cfrac{1}{\sum_{x=1}^{m} Y_{gxn}} + \cfrac{1}{Y_{t2n}}} + \cfrac{1}{\cfrac{1}{Y_{t3n}} + \cfrac{1}{Y_{stn}}}} \quad (13)$$

According to FIG. 5 and KCL, the negative-sequence voltage at PCC can be obtained as, $$v_{pccdqn} = \frac{Y_{sn}}{Y_{eqn} + Y_{sn}}V_{sdqn} \quad (14)$$

The negative-sequence admittance of transformer can be obtained after by commissioning tests, in other word, $Y_{t1n}$, $Y_{t2n}$, $Y_{t3n}$ cannot be changed. Therefore, from (13) and (14), we can see that as long as the NSOA of PMSGs or CHB-STATCOM is large enough, the NSOA see from the PCC (see FIG. 5) $Y_{eqn}$ is also large enough, thus, the negative-sequence voltage at PCC is equal or approximately equal to zero, which means that the unbalanced grid voltage can be suppressed. Besides, the coordinated compensation for unbalanced voltage among multiple PMSGs and CHB-STATCOM can be implemented by changing their corresponding NSOA. Specifically, the PMSGs or CHB-STATCOM with large NSOA will inject more negative-sequence current than them with small NSOA.

Operation Characteristic of CHB-STATCOM Under Unbalanced Grid Condition

System Configuration and Controller

Figure 6:
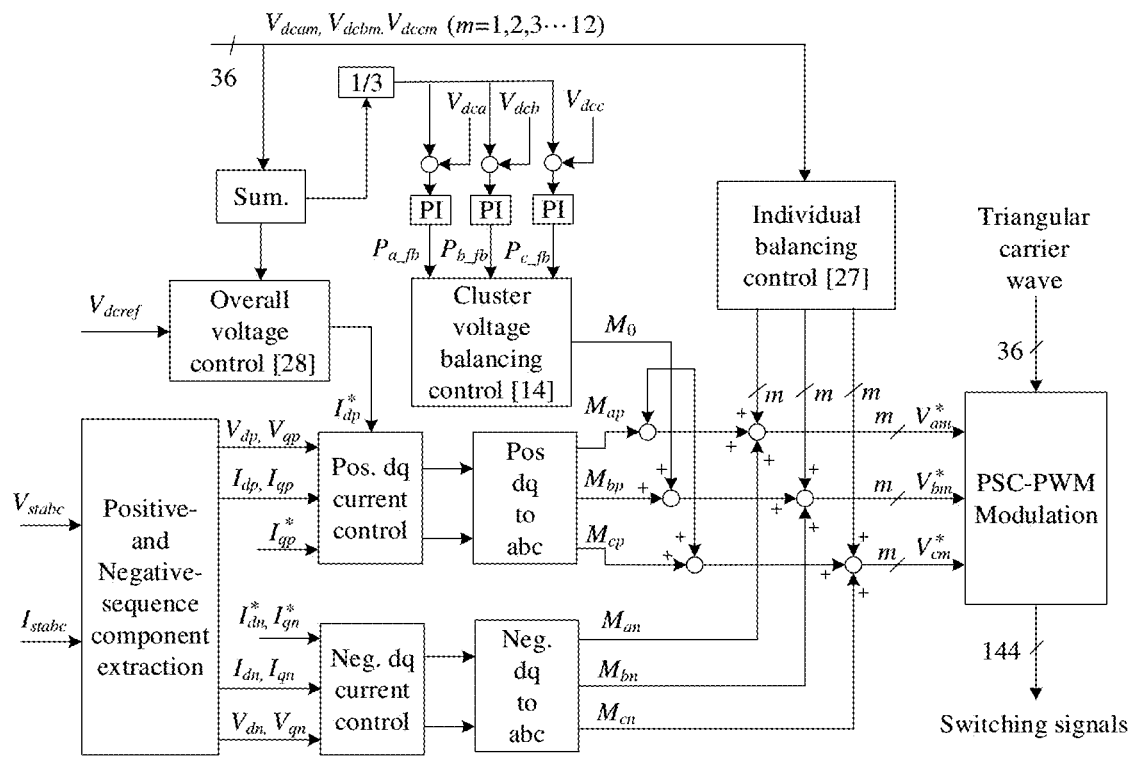
FIG. 6 shows the overall control structure of the CHB-STATCOM.

The operating principle of CHB-STATCOM under unbalanced grid condition can be found in [8], [12]. FIG. 6 shows the overall control structure of the CHB-STATCOM under unbalanced grid condition. The overall dc voltage control generates the positive-sequence active current ($I_{dp}^*$) to the positive-sequence current controller, and keeps the average value of the dc bus voltages of all cells at the dc voltage reference ($V_{dcref}$). The individual balancing voltage control mainly keeps the dc voltage of each cell at the predefine value.

In this invention, CHB-STATCOM provides negative-sequence currents to suppress the unbalanced voltage, which inevitably result in uneven active powers among three clusters. Thus, the balanced phenomenon of dc voltage of three clusters of CHB-STATCOM will be broken. Here, cluster voltage balancing control is used to generate a suitable zero-sequence command ($M_0$) to redistribute the active power of three clusters, and make the dc voltage of three-cluster balanced. The $M_0$ can be calculated as [12], $$M_0 = \frac{V_{std0}\cos(\omega t) + V_{stq0}\sin(\omega t)}{V_{dc\_ave}} \quad (15)$$

$V_{std0}$ and $V_{stq0}$ can be calculated as [16], $$\begin{bmatrix} V_{std0} \\ V_{stq0} \end{bmatrix} = \frac{1}{(I_{stdp}^2 + I_{stqp}^2) - (I_{stdn}^2 + I_{stqn}^2)} \begin{bmatrix} I_{stdp} - I_{stdn} & I_{stqp} - I_{stqn} \\ I_{stqp} + I_{stqn} & -I_{stdn} - I_{stdp} \end{bmatrix}. \quad (16)$$

$$\left[\begin{bmatrix} 2P_{a\_fb} \\ \dfrac{2\sqrt{3}\,P_{a\_fb}+4\sqrt{3}\,P_{b\_fb}}{3} \end{bmatrix}+\right.$$

$$\left.\begin{bmatrix} -I_{stdn} & I_{stqn} & -I_{stdp} & I_{stqp} \\ I_{stqn} & I_{stdn} & I_{stqp} & I_{stdp} \end{bmatrix}\cdot\begin{bmatrix} V_{stdp} \\ V_{stqp} \\ V_{stdn} \\ V_{stqn} \end{bmatrix}\right]$$

where $V_{stdp}$, $V_{stqp}$, $V_{stdn}$, $V_{stqn}$, $I_{stdp}$, $I_{stqp}$, $I_{stdn}$, $I_{stqn}$ are the d-q components of positive-sequence and negative-sequence output voltage and current of CHB-STATCOM; $P_{a\_fb}$ and $P_{b\_fb}$ can be obtained by a proportional integral (PI) controller to derive dc voltage of phase-A and phase-B clusters, respectively. Here, the voltage drop of inductance is neglected.

The maximum amplitude of output phase voltage of CHB-STATCOM can be calculated as, $$V_{st\,max}=\max\left(\sqrt{V_{stmp}^2+V_{stmn}^2+V_{st0}^2}\right),\ m=a,b,c \qquad (17)$$

where $V_{stmp}$, $V_{stmn}$ are the amplitude of the positive-sequence and negative-sequence in three-phase, respectively; $V_0$ is the amplitude of the zero-sequence voltage. $V_{stmp}$, $V_{stmn}$ and $V_0$ can be calculated by the dq transformation. To prevent the over-modulation, $V_{stmax}$ must be lower than the maximum permit output voltage, that is, $$V_{st\,max}\le N\cdot M_{dc}\cdot V_{dc} \qquad (18)$$

where $M_{dc}$ is the modulation index; N is the numbers of cells per phase. In this paper, the PSC-PWM scheme is used, hence, $M_{dc}=1$. Except for the limitation of the maximum amplitude of output voltage, the limitation of the peak current should be considered. The instantaneous current of the CHB-STATCOM can be expressed as, $$I_{stm}=\sqrt{(I_{stp})^2+(I_{stpn})^2+2I_{stp}I_{stn}\cos(\varphi_i-d\cdot 2\pi/3)} \qquad (19)$$

where m=a, b, c, and d=0, 1, −1; pi is the angle difference between the positive-sequence and negative-sequence current. $I_{stp}$, $I_{stn}$ can be calculated as, $$I_{stp}=\sqrt{(I_{stdp})^2+(I_{stqp})^2} \qquad (20)$$

$$I_{stn}=\sqrt{(I_{stdn})^2+(I_{stqn})^2} \qquad (21)$$

From (19), we can know that the instantaneous peak current can reach the maximum value when the trigonometric is equal to 1, thus, the peak value of phase current is expressed by, $$I_{st\,max}=I_{stp}+I_{stn} \qquad (22)$$

It can be found in IEEE Std1517 that the fault current is usually limited to be less than 1.25 times the rated value. Here, the maximum allowable value of phase current is set as 1.25 p.u., therefore, the limitation of phase current can be expressed as, $$I_{st\,max}\le 1.25 \qquad (23)$$

Figure 7:
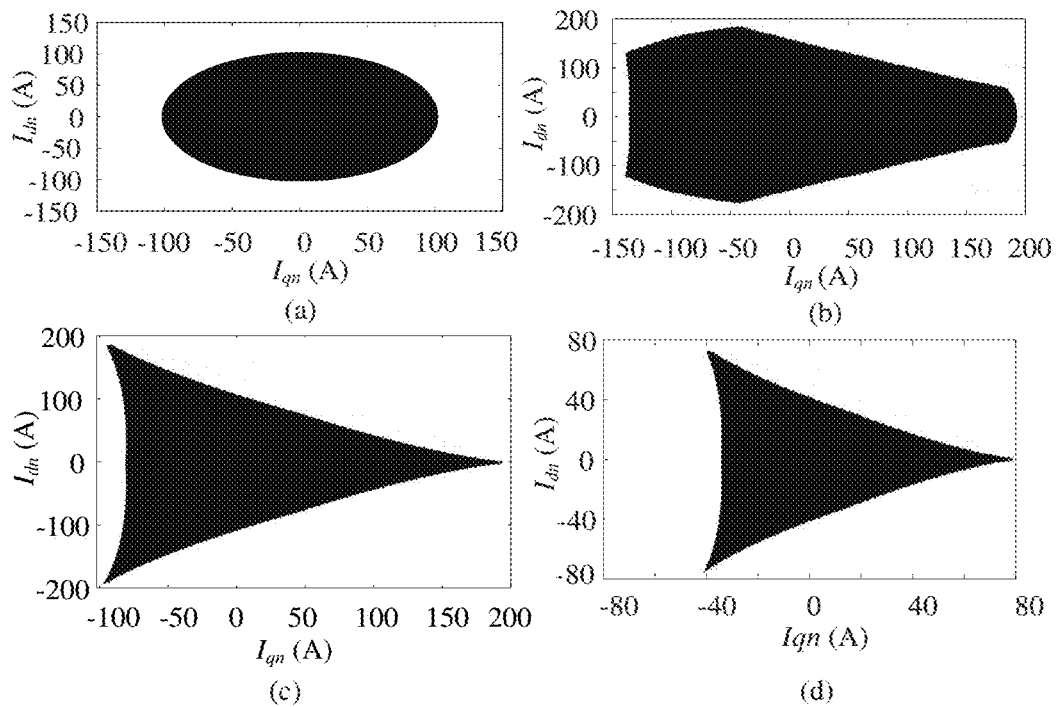
FIG. 7 show the compensation region of negative-sequence of CHB-STATCOM under different output reactive power. (a) Q=1 p.u.; (b) Q=0.8 p.u.; (c) Q=0.5 p.u.; (d) Q=0.2 p.u.

The negative-sequence current injected by CHB-STATCOM is depend on (18) and (23), according to these two limitations, the negative-sequence current injection region of a 10 kV, ±5 MVar CHB-STATCOM can be obtained at the different reactive output power, as shown in FIG. 7.

FIG. 7 clearly shows that when the output reactive power is equal to 1.0 p.u., the compensation range of negative is a circle, which means that the limitation is just depended on (23). When the CHB-STATCOM not working at the rated condition, although the lower output reactive power means the more remaining capacity to be used, the boundary of compensation region is not a positive correlation with remaining capacity, because there is no risk of over-current and it is depend on (18), Therefore, the boundary of compensation region is not an irregular shape. Thus, it is necessary to make sure the negative-sequence current injected by the CHB-STATCOM should be within the safe compensation range.

Negative-Sequence Current References Calculation for CHB-STATCOM

Figure 8:
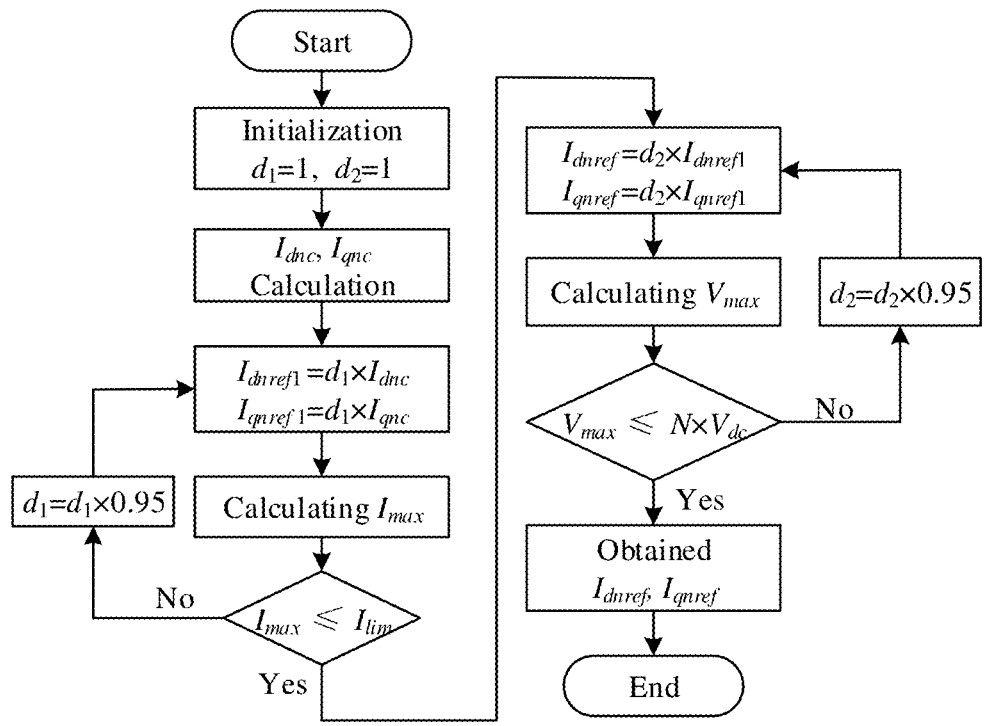
FIG. 8 shows the calculation method of negative-sequence current reference for CHB-STATCOM.

FIG. 8 shows the calculation method for negative-sequence current reference. Here, the two attenuation coefficients $d_1$, $d_2$ are introduced to reduce the desired negative-sequence to satisfy the respective inequalities (23) and (18). The expression for reducing negative-sequence current references can be presented as, $$I_{dnref1}=d_1\times I_{dnc},\ I_{qnref1}=d_1\times I_{qnc} \qquad (24)$$

$$I_{dnref}=d_2\times I_{dnref1},\ I_{qnref}=d_2\times I_{qnref1}, \qquad (25)$$

where $I_{dnc}$, $I_{qnc}$ can be obtained from FIG. 9, which will be discussed in the next section.

The desired negative-sequence current should satisfy (23), otherwise, $d_1$ uses 0.95 as a step to reduce the negative-sequence reference until (23) is satisfied, we remark the negative-sequence references from the first iteration method are $I_{dnref1}$ and $I_{qnref1}$. The $V_{std0}$ and $V_{stq0}$ can be calculated by using the $I_{dnref1}$ and $I_{qnref1}$ to replace $I_{stdn}$ and $I_{stqn}$ in (16), then the maximum amplitude of output phase voltage of CHB-STATCOM can be calculated by using (17), which can be used to judge the (18) is satisfied or not. If the limitation of (18) is satisfied, the $I_{dnref1}$ and $I_{qnref1}$ will be transmitted to the negative-sequence current controller of the CHB-STATCOM, otherwise, $d_2$ also uses 0.95 as a step to reduce the negative-sequence references until (18) is satisfied. In this way, the desired negative-sequence current can be limited within the safe operation area, in other word, the over-modulation and over-current phenomenon cannot occur, which can make sure the CHB-STATCOM operates stably.

Coordinated Control Strategy of CHB-STATCOM and PMSG for Suppressing Unbalanced Voltage at the PCC To address the over-modulation problem that the conventional virtual admittance method may bring, a virtual NSOA method based on a negative-sequence current reference for CHB-STATCOM and PMSGs is proposed. The participation factors of them based on a secondary control strategy are designed, thus their NSOA can be changed by controlling the participation factor. Besides, a coordinated control strategy of CHB-STATCOM and PMSGs for suppressing unbalanced voltage is discussed.

Adaptive Virtual NSOA Method

Figure 9:
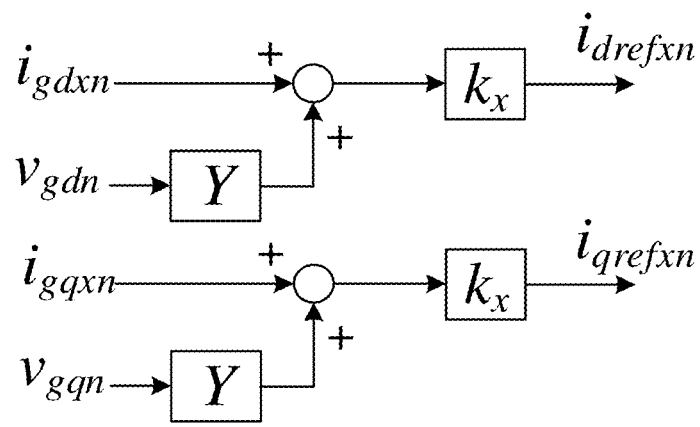
FIG. 9 shows the proposed virtual NSOA calculation method.

FIG. 9 shows the proposed virtual NSOA method, the negative-sequence reference can be calculated as, $$I_{dqrfxn}(I_{dqxn}+V_{gdqn}Y_{bn})k_x \qquad (26)$$

where $Y_{bn}$ is a known constant, here $Y_{bn}=8$. $k_x$ is the participation factor of the PMSGs (e.g., x=1, 2, . . . m) or the CHB-STATCOM (e.g., x=st). $I_{dqxn}$ and $I_{dqrefxn}$ are the measured and the reference negative-sequence current, respectively; $V_{gdqn}$ is the d-q components of negative-sequence voltage at the PCC.

Assuming that the PI parameters are perfectly designed, the negative-sequence control loop can track negative-sequence current reference well, as follows, $$I_{dqrefxn} = I_{dqn} \tag{27}$$

Substituting (27) into (26), the NOSA of PMSGs or CHB-STATCOM can be expressed as, $$Y_{eqxn} = \frac{I_{dqxn}}{V_{gdqn}} = \frac{k_x}{1-k_x} Y_{bn} \tag{28}$$

Equation (28) clearly show that the NSOA of PMSGs or CHB-STATCOM is equal to 0 if $k_x=0$, while it can reach infinity if $k_x=1$. Therefore, $k_x$ should be limited to be within 0-1, to control the NSOA of PMSGs or CHB-STATCOM from 0 to infinity.

Figure 10:
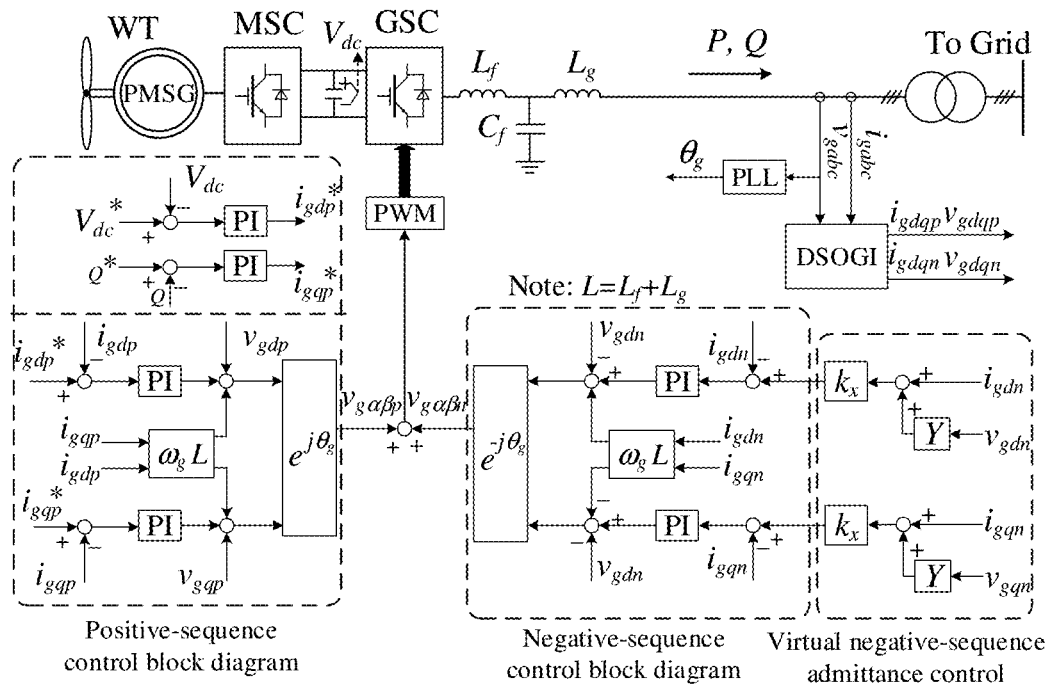
FIG. 10 shows the control structure for PMSG with the proposed virtual NSOA method.

FIG. 10 shows the control structure of PMSG with NSOA method. In FIG. 10, the angle $\theta_g$ of the grid voltage is obtained by a phase-locked loop (PLL) to implement the Park's transformation, then, the positive and negative component of voltage and current in dq frame can be obtained by a dual-second-order-generalized integrator (DSOGI) [30]. Moreover, the positive-sequence control block can track the positive-sequence current reference and generate the active power to the grid. While the negative-sequence control block ensures the PMSGs can inject the negative-sequence current calculated by NSOA method to compensate unbalanced grid voltage.

Participation Factor Calculation for PMSG

Figure 11:
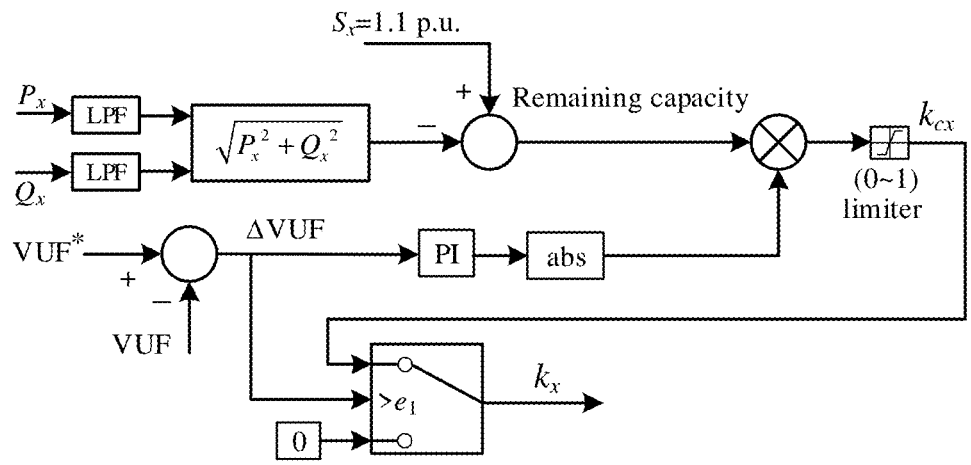
FIG. 11 shows the participation factor calculation method of PMSG.

FIG. 11 shows the participation factor calculation method for PMSGs. In this paper, a VUF controller is proposed to keep the VUF of PCC equal to the predefined value VUF*, which is equal to 2%. Because the International Electrotechnical Commission recommends that voltage unbalance in power grids should be limited to 2%. The VUF is the ratio between the negative- and positive-sequence components of grid voltage. First, the deviation between the measured VUF and the reference is transmitted to a PI controller, the abs function block ensures the value comes from the PI controller is a positive. Moreover, the double-frequency fluctuation of power will be excited because of the interaction between the positive-sequence voltage and the negative-sequence current, and between the negative-sequence voltage and the positive-sequence current. Therefore, the low pass filter (LPF) is chosen to remove the double-frequency components of the output power.

As mentioned above, the final participation factor $k_x$ should be limited to within 0-1, thus, a 0-1 limiter should be used. In order to ensure that the controller does not work when the VUF is lower than 2%, a selector with dead-band is added in the participation factor calculation block. Specifically, if $\Delta VUF > e_1$, the final participation factor $k_x$ will be equal to $k_{cx}$, otherwise, the $k_x=0$. Here, the $e_1$ is the threshold of the dead-band, which can be predefined. In this paper, $e_1$ is set to 0.05. It is worth noting that if the $e_1$ is too small (e.g., almost 0), the $k_x$ will switch from 0 to $k_{cx}$ too frequently, which makes the system unstable, while the bigger $e_1$ makes the compensation accuracy decrease.

Coordination of PMSGs and CHB-STATCOM

Figure 12:
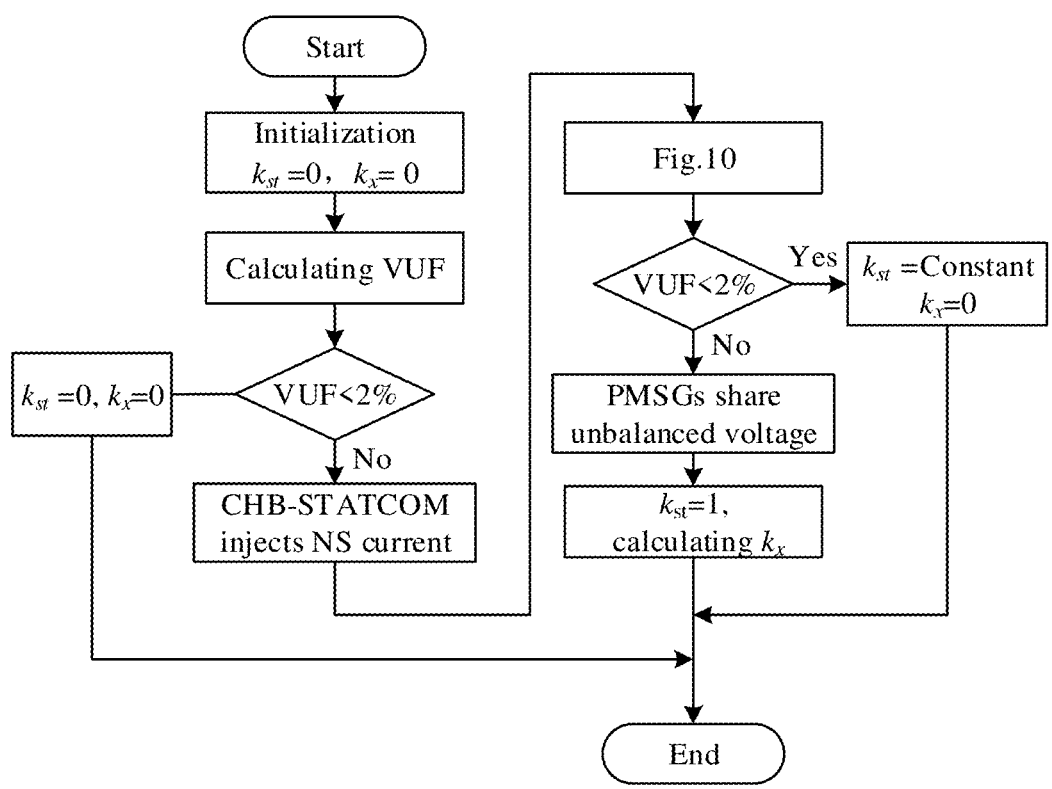
FIG. 12 shows the coordinated control for sharing unbalanced grid voltage of CHB-STATCOM and PMSG.

FIG. 12 shows the flowchart of coordinated control strategy for unbalanced voltage suppression of CHB-STATCOM and PMSGs. FIG. 12 clearly show that the CHB-STATCOM will inject the suitable negative-sequence currents to compensate for the unbalanced grid voltage first if the VUF of PCC exceeds 2%. Once the VUF exceeds the maximum value that the CHB-STATCOM can compensate for, the PMSGs will participate in sharing the remaining unbalanced grid voltage. Therefore, the participation factor of the CHB-STATCOM $k_{st}$ is set to 1, and the participation factor of PMSGs $k_x$ can be calculated by the proposed method (see FIG. 11). Note that the participation factors and the remaining capacity of PMSGs are positively related.

Case Study

A typical 50 MW DWF with 25 PMSGs and a ±5 Mvar CHB-STATCOM, as shown in FIG. 1, is simulated in PSCAD/EMTDC to verify the proposed coordinated control strategy. The parameters of CHB-STATCOM are listed in Table I. Three aggregated PMSGs are established to represent the three groups PMSGs, which can be represented by $G_1$, $G_2$ and $G_3$. Here, SCR is equal to 2. Two typical cases are considered. Case I: Only CHB STATCOM injects the negative-sequence current. Case II: CHB STATCOM injects the maximum negative-sequence current and PMSGs participate in sharing the unbalanced grid voltage.

TABLE I

PARAMETERS OF CHB-STATCOM

| Parameters | Value |
| --- | --- |
| Numbers of cells per phase | 12 |
| Rated voltage (line-line) | 10 kV |
| Rated capacity | 5 MVar |
| Rated current | 288 A |
| DC bus voltage | 900 V |
| Filter inductance | 5 mH |
| Switching frequency | 400 Hz |

Case I: Only CHB-STATCOM Participates in Compensating Unbalanced Grid Voltage

To test the negative-sequence current injection capability of CHB-STATCOM, the following circumstances are considered in this case: before t=0.9 s, the CHB-STATCOM injects the rated positive-sequence reactive current; at t=0.9 s, it is required to inject the negative-sequence current to track the VUF reference as much as possible; at t=1.78 s, t=2.2 s, t=3.2 s, the reactive power references are changed to 0.8 p.u., 0.5 p.u., and 1.0 p.u., respectively.

Figure 13:
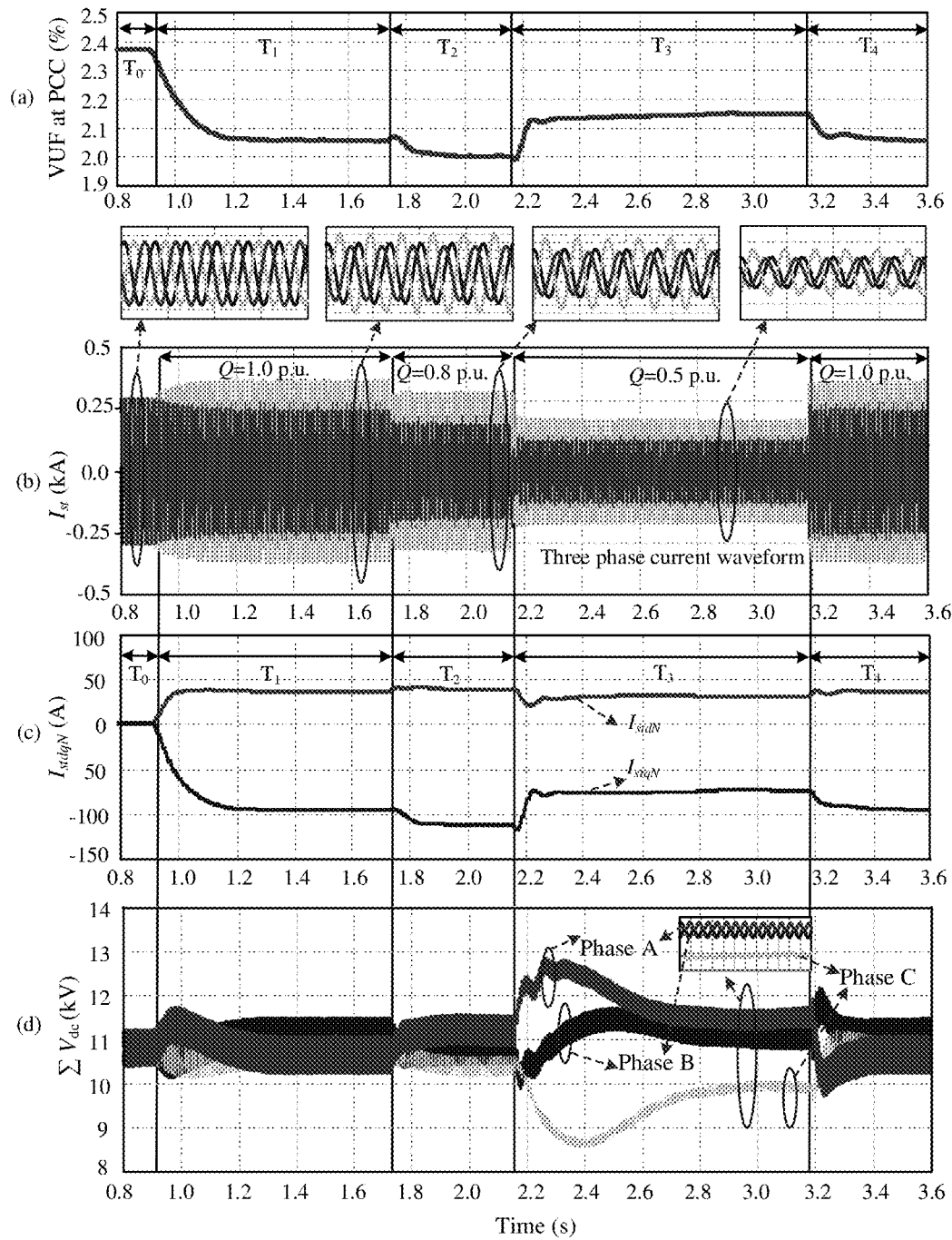
FIG. 13 show the results of CHB-STATCOM operating under unbalanced grid voltage when only CHB-STATCOM participates in compensating unbalanced grid voltage. (a) Output current; (b) d-q components of output negative-sequence current; (c) VUF at PCC; (d) DC voltage in each phase.

FIG. 13 show the results of CHB-STATCOM operating under unbalanced grid voltage when only CHB-STATCOM participates in compensating unbalanced grid voltage. It is found that from FIG. 13a that without the negative-sequence voltage compensation, the VUF at PCC is 2.4%. The VUF can be controlled to 2.0% in the $T_2$ time interval because the CHB-STATCOM injects the enough negative-sequence currents without over modulation and over current phenomenon. However, the VUF at PCC just can be controlled to 2.05% and 2.15% in $T_1$ and $T_3$ time interval, respectively. In $T_1$ time interval, the CHB-STATCOM has not sufficient capacity to use because it operates at the rated condition, which means that there are no sufficient negative-sequence currents to make the VUF decreasing to 2.0%. In $T_2$ time interval, although the CHB-STATCOM has enough remaining capacity, the boundary of compensation region depends on the limitation of (18), as shown in FIG. 7c. The negative-sequence compensation capability is less than $T_1$ time interval, which result that the VUF in the $T_3$ time interval is larger than $T_1$ time interval. It can be seen from FIG. 13b and FIG. 13c that the negative-sequence currents injection capability is strongest than other two time intervals. This phenomenon is in accordance with FIG. 7. FIG. 13d clearly show that the dc voltage of three phase clusters becomes unbalanced when it injects the three-phase unbalanced currents. However, it still operates well even under the unbalanced dc power because of over modulation problem cannot be excited.

Case II: Coordinated Control of CHB-STATCOM and PMSGs

In this case, the simulation considers the following circumstance: at t=0.9 s, the CHB-STATCOM and PMSGs starts to inject negative-sequence according to the algorithm; at t=8.1 s, the active power of $G_1$ is changed from 11.2 MW to 12.8 MW. At the beginning, we assume that the voltage of Phase-B drops from 1.0 p.u. to 0.85 p.u, which excites the voltage unbalance phenomenon occur. According to the calculation result, the VUF at PCC is 6.8%. Meanwhile, the CHB-STATCOM will inject the maximum negative-sequence to decrease the value VUF as much as possible. Here, the reactive power reference is set to 0.8 p.u.

Figure 14:
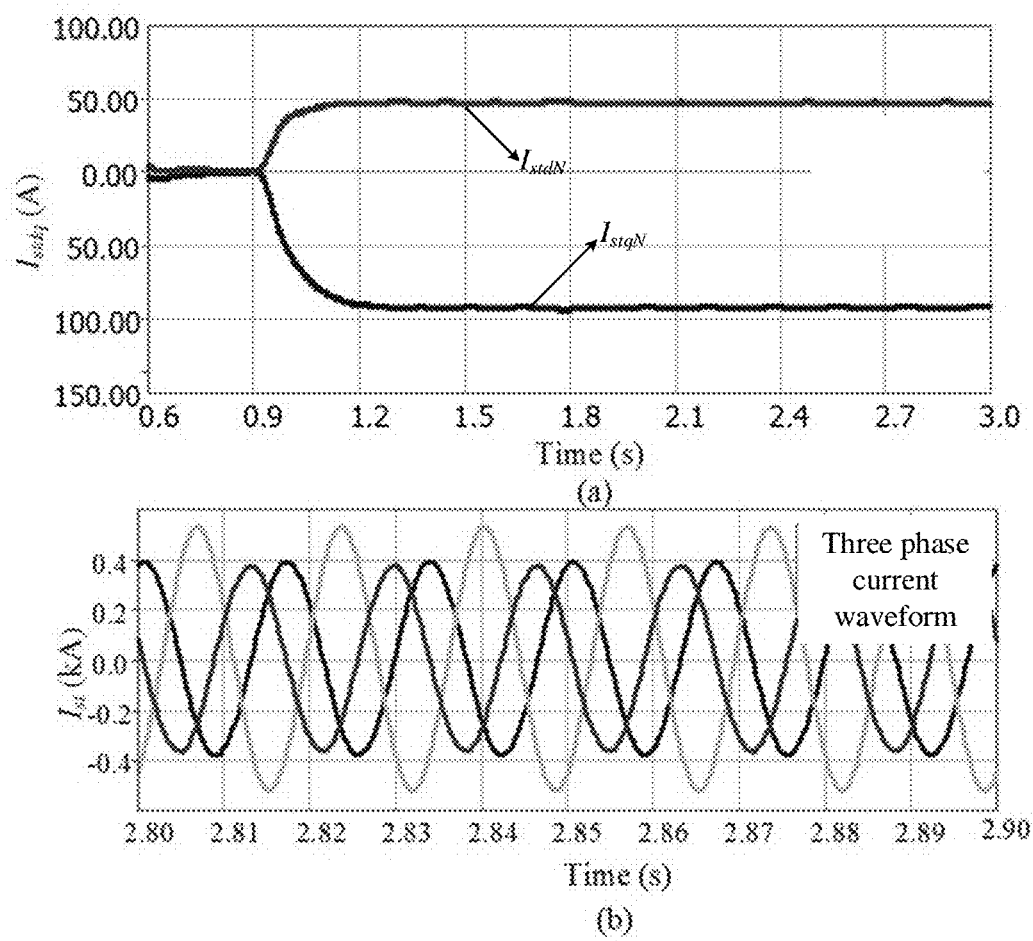
FIG. 14 show output current of the CHB-STATCOM when CHB-STATCOM and PMSGs all participate in compensating unbalanced grid voltage. (a) d-q components of negative-sequence current. (b) Three-phase current.

FIG. 14 shows the output current of CHB-STATCOM. Owing to the VUF at PCC exceeding the compensation capability of CHB-STATCOM, PMSGs are required to share the unbalanced voltage by injecting the negative-sequence current.

Figure 15:
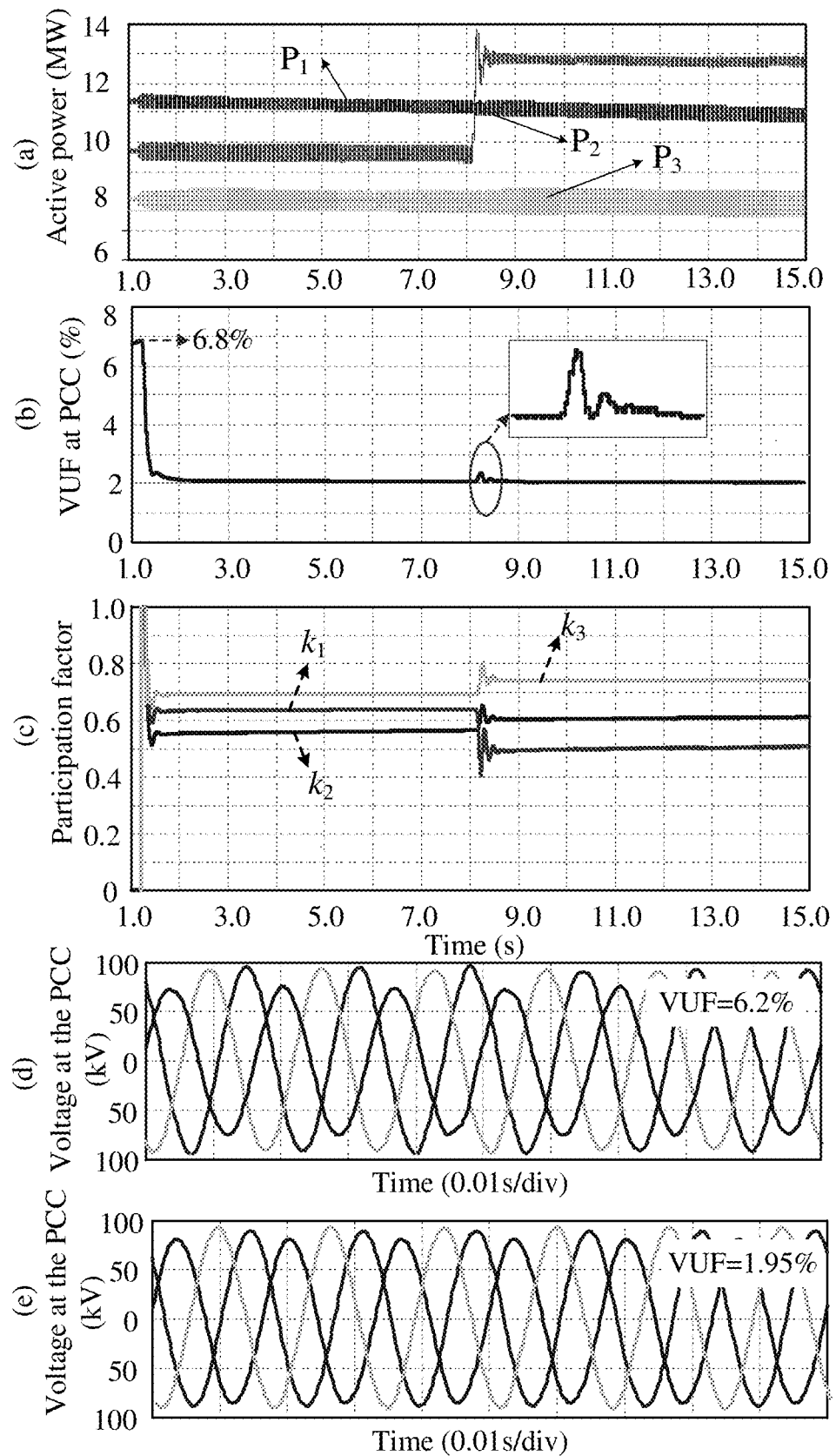
FIG. 15 show the simulation results about PCC and PMSG. (a) Active power; (b) VUF at PCC; (c) Participation factors; (d) Grid voltage without compensation; (e) Grid voltage after compensation.

FIG. 15 show the simulation results about PCC and PMSG. It can be seen from FIG. 15b that the VUF at PCC can be controlled from 6.8% to 2% in spite of a small fluctuation when the active power of group 1 PMSGs changes as shown in FIG. 15a. FIG. 15d and FIG. 15e are the grid voltage with and without unbalanced voltage compensation, respectively. The grid voltage is close to sinusoidal when CHB-STATCOM and PMSGs inject the desired negative-sequence current at the same time. In FIG. 15c, it can be found that, as the remaining capacity of $G_1$ decreases, the participation factor $k_1$ decreases from 0.62 to 0.50, to keep the VUF at PCC at the desired value, and the participation factor of $G_2$ and $G_3$, $k_2$ and $k_3$, increase from 0.56 and 0.70 to 0.6 and 0.73, respectively.

Figure 16:
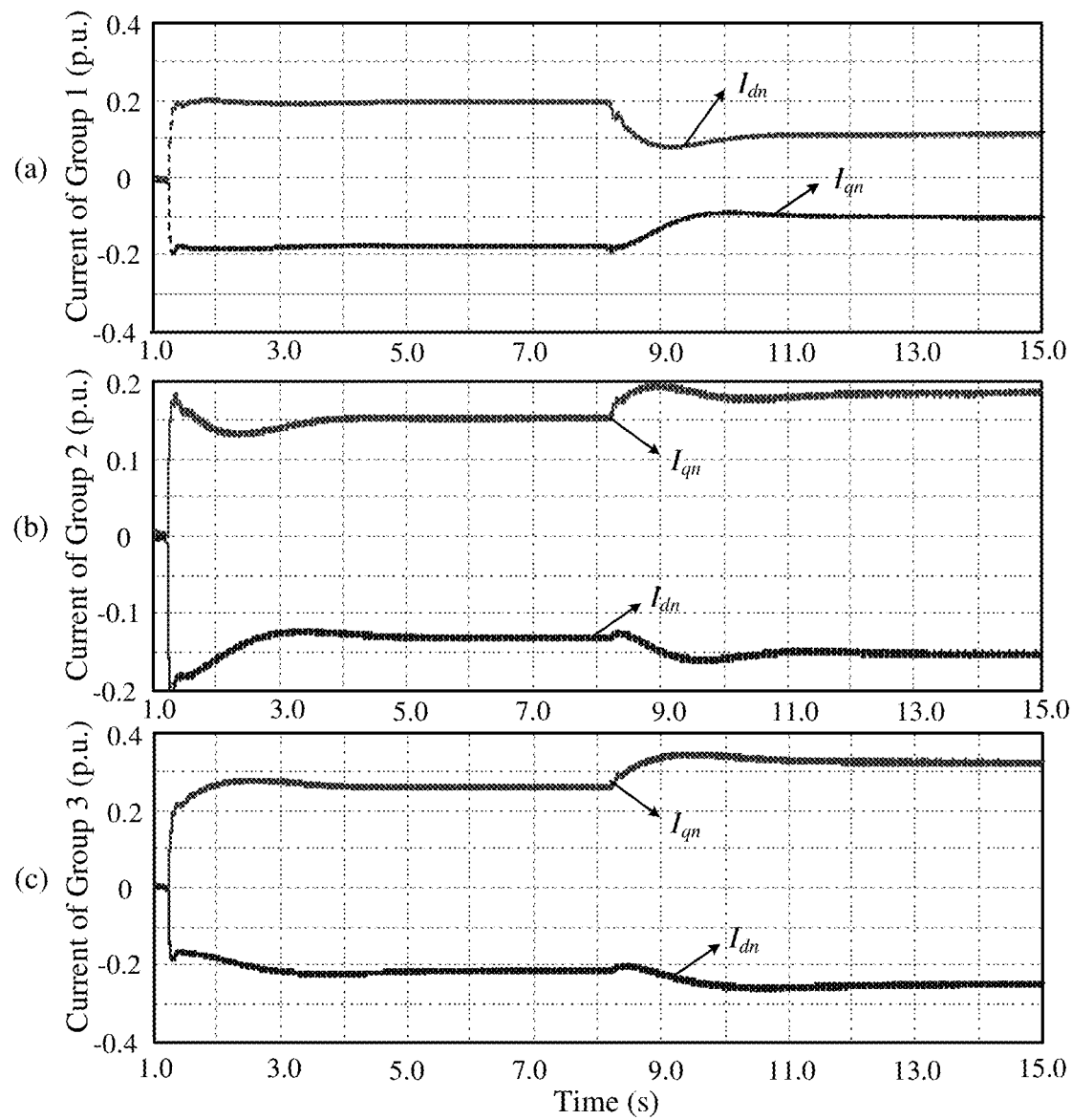
FIG. 16 show the negative-sequence currents in d-q frame of three investigated PMSGs.

FIG. 16 shows the d-q components of negative-sequence for three groups PMSG. It can be seen from FIG. 16a that when the participation factor changes, the d-q negative-sequence currents of $G_1$ change from −0.19 p.u. and 0.2 p.u. to −0.1 p.u. and 0.1 p.u., respectively. Similarly, from FIG. 16b and FIG. 16c, the d-q negative-sequence currents of $G_2$ and $G_3$ change from −0.13 p.u. and 0.15 p.u. and −0.15 p.u. and 0.27 p.u. to −0.15 p.u. and 0.18 p.u., and to −0.25 p.u. and 0.31 p.u., respectively. Therefore, the output negative-sequence current of PMSGs are in accordance with the participation factor, which is proportional to their remaining capacity.

Based on the simulation results, it is demonstrated that the CHB-STATCOM will inject negative-sequence current to decrease the VUF at the PCC, it the CHB-STATCOM injects the maximum negative-sequence currents and the VUF cannot be decrease to 2%, the PMSGs will participate in sharing the unbalanced grid voltage according to their participate factor. The coordinate control strategy can suppress the unbalanced grid voltage for a dispersed wind farm without any additional cost but changing the corresponding controller for CHB-STATCOM and PMSGs.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for suppressing unbalanced voltage at a Point of Common Coupling being located between a dispersed wind farm and a grid, the dispersed wind farm comprising a plurality of wind turbines, the system comprising:
    a measurement device for measuring unbalanced voltage and current at the Point of Common Coupling;
    a dispersed wind farm controller for controlling the plurality of wind turbines and a STATCOM;
    a voltage unbalance factor calculating block;
    wherein the voltage unbalance factor calculating block is coupled to the measurement device;
    wherein the dispersed wind farm controller is coupled to the voltage unbalance factor calculating block;
    wherein the voltage unbalance factor is calculated by ratio between an amplitude of negative-sequence and an amplitude of positive-sequence of the voltage at the Point of Common Point;
    a STATCOM controller;
    wherein the STATCOM controller is coupled to the dispersed wind farm controller;
    a plurality of wind turbine controllers;
    wherein the plurality of wind turbines controllers are coupled to the dispersed wind farm controller;
    a grid-connected transformer;
    an adaptive virtual negative-sequence output admittance controller;
    wherein the STATCOM controller is coupled to the adaptive virtual negative-sequence output admittance controller, and
    wherein the wind turbine controllers are coupled to the adaptive virtual negative-sequence output admittance controller;
    wherein a negative-sequence current injected ability of STATCOM is determined by two limitations, and they are a maximum amplitude of output phase voltage $V_{stmax}$ and the maximum amplitude of output phase current $I_{stmax}$, $$V_{st\,max} \leq N \cdot M_{dc} \cdot V_{dc}$$

$$I_{st\,max} \leq 1.25$$

wherein $M_{dc}$ is a modulation index; N is a numbers of cells per phase; $M_{dc}=1$; $V_{dc}$ is the dc voltage of CHB-STATCOM;

And wherein the maximum amplitude of output phase voltage $V_{stmax}$ can be calculated by, $$V_{st\,max} = \max\left(\sqrt{V_{stmp}^2 + V_{stmn}^2 + V_{st0}^2}\right), m = a, b, c$$

wherein $V_{stmp}$, $V_{stmn}$ are the amplitude of the positive-sequence and negative-sequence in three-phase, respectively; $V_{st0}$ is the amplitude of the zero-sequence voltage, $V_{stmp}$, $V_{stmn}$ and $V_{st0}$ can be calculated by a d-q transformation;

wherein $V_{std0}$ and $V_{stq0}$ can be calculated as, $$\begin{bmatrix} V_{std0} \\ V_{stq0} \end{bmatrix} = \frac{1}{(I_{stdp}^2 + I_{stqp}^2) - (I_{stdn}^2 + I_{stqn}^2)} \cdot \begin{bmatrix} I_{stdp} - I_{stdn} & I_{stqp} - I_{stqn} \\ I_{stqp} + I_{stqn} & -I_{stdn} - I_{stdp} \end{bmatrix}.$$

$$\left( \begin{bmatrix} 2P_{a\_fb} \\ \dfrac{2\sqrt{3}\, P_{a\_fb} + 4\sqrt{3}\, P_{b\_fb}}{3} \end{bmatrix} + \begin{bmatrix} -I_{stdn} & I_{stqn} & -I_{stdp} & I_{stqp} \\ I_{stqn} & I_{stdn} & I_{stqp} & I_{stdp} \end{bmatrix} \cdot \begin{bmatrix} V_{stdp} \\ V_{stqp} \\ V_{stdn} \\ V_{stdn} \end{bmatrix} \right)$$

wherein $V_{stdp}$, $V_{stqp}$, $V_{stdn}$, $V_{stqn}$, $I_{stdp}$, $I_{stqp}$, $I_{stdn}$, $I_{stqn}$ are the d-q components of positive-sequence and negative-sequence output voltage and current of CHB-STATCOM; $P_{a\_fb}$ and $P_{b\_fb}$ can be obtained by a proportional integral controller to derive dc voltage of phase-A and -B clusters, respectively;

wherein a maximum amplitude of output phase current $I_{stmax}$ can be obtained by, $$I_{st\,max} = I_{stp} + I_{stn}$$

wherein $I_{stp}$, $I_{stn}$ are the magnitude of positive-sequence and negative-sequence current of CHB-STATCOM.

2. The system of claim 1, wherein the wind turbines are permanent magnet synchronous generators.

3. The system of claim 1, where the STATCOM is a cascade H-bridge STATCOM (CHB-STATCOM).

4. The system of claim 1, wherein the grid-connected transformer is a three-winding transformer.

5. The system of claim 3, wherein the CHB-STATCOM is connected to a tertiary-winding of the grid-connected transformer.

6. The system of claim 3, wherein the CHB-STATCOM can inject inductive and capacitive reactive power from the wind farm to the grid.

7. A method for suppressing unbalanced voltage at a Point of Common Coupling being located between a dispersed wind farm and a grid, the dispersed wind farm comprising a plurality of wind turbines, the method comprising:
  measuring unbalanced voltage and current at the Point of Common Coupling;
  calculating a voltage unbalance factor which is calculated by ratio between an amplitude of negative-sequence and an amplitude of positive-sequence of the voltage at the Point of Common Point;
  controlling the plurality of wind turbines and a STATCOM by a dispersed wind farm controller, which can provide a control signal for suppressing the unbalanced voltage at the Point of Common Coupling;
  wherein the control signal is that whether the STATCOM or wind turbines should share the unbalanced voltage or not;
  wherein the STATCOM can inject negative-sequence current to the grid to suppress the unbalanced voltage at the Point of Common Coupling;
  the wind turbines can inject negative-sequence current to the grid to suppress the unbalanced voltage at the Point of Common Coupling;
  providing a negative-sequence current reference for the STATCOM and the wind turbines by an adaptive virtual negative-sequence output admittance controller, and
  wherein the wind turbines and the STATCOM can be used to suppress the unbalanced voltage at the Point of Common Coupling by changing their corresponding negative-sequence output admittance;

wherein a negative-sequence current injected ability of STATCOM is determined by two limitations, and they are a maximum amplitude of output phase voltage $V_{stmax}$ and the maximum amplitude of output phase current $I_{stmax}$, $$V_{st\,max} \le N \cdot M_{dc} \cdot V_{dc}$$

$$I_{st\,max} \le 1.25$$

wherein $M_{dc}$ is a modulation index; N is a numbers of cells per phase; $M_{dc} = 1$; $V_{dc}$ is the dc voltage of CHB-STATCOM;

And wherein the maximum amplitude of output phase voltage $V_{stmax}$ can be calculated by, $$V_{st\,max} = \max\left(\sqrt{V_{stmp}^2 + V_{stmn}^2 + V_{st0}^2}\right), m = a, b, c$$

wherein $V_{stmp}$, $V_{stmn}$ are the amplitude of the positive-sequence and negative-sequence in three-phase, respectively; $V_{st0}$ is the amplitude of the zero-sequence voltage, $V_{stmp}$, $V_{stmn}$ and $V_{st0}$ can be calculated by a d-q transformation;

wherein $V_{std0}$ and $V_{stq0}$ can be calculated as, $$\begin{bmatrix} V_{std0} \\ V_{stq0} \end{bmatrix} = \frac{1}{(I_{stdp}^2 + I_{stqp}^2) - (I_{stdn}^2 + I_{stqn}^2)} \cdot \begin{bmatrix} I_{stdp} - I_{stdn} & I_{stqp} - I_{stqn} \\ I_{stqp} + I_{stqn} & -I_{stdn} - I_{stdp} \end{bmatrix}.$$

$$\left( \begin{bmatrix} 2P_{a\_fb} \\ \dfrac{2\sqrt{3}\, P_{a\_fb} + 4\sqrt{3}\, P_{b\_fb}}{3} \end{bmatrix} + \begin{bmatrix} -I_{stdn} & I_{stqn} & -I_{stdp} & I_{stqp} \\ I_{stqn} & I_{stdn} & I_{stqp} & I_{stdp} \end{bmatrix} \cdot \begin{bmatrix} V_{stdp} \\ V_{stqp} \\ V_{stdn} \\ V_{stdn} \end{bmatrix} \right)$$

wherein $V_{stdp}$, $V_{stqp}$, $V_{stdn}$, $V_{stqn}$, $I_{stdp}$, $I_{stqp}$, $I_{stdn}$, $I_{stqn}$ are the d-q components of positive-sequence and negative-sequence output voltage and current of CHB-STATCOM; $P_{a\_fb}$ and $P_{b\_fb}$ can be obtained by a proportional integral controller to derive dc voltage of phase-A and -B clusters, respectively;

wherein a maximum amplitude of output phase current $I_{stmax}$ can be obtained by, $$I_{st\,max} = I_{sp} + I_{stn}$$

wherein $I_{stp}$, $I_{stn}$ are the magnitude of positive-sequence and negative-sequence current of CHB-STATCOM.

8. The method of claim 7, wherein a relationship between the unbalanced voltage at the Point of Common Coupling and the unbalance voltage at the grid is defined, $$v_{pccdqn} = \frac{Y_{sn}}{Y_{eqn} + Y_{sn}} V_{sdqn}$$

$$Y_{eqn} = \frac{1}{\dfrac{1}{Y_{t1n}} + \dfrac{1}{\dfrac{1}{\sum\limits_{x=1}^{m} Y_{gxn}} + \dfrac{1}{Y_{t2n}}} + \dfrac{1}{\dfrac{1}{Y_{t3n}} + \dfrac{1}{Y_{sn}}}}$$

wherein the unbalanced grid is modeled as an unbalanced voltage $v_{sdqn}$ and a negative-sequence admittance $Y_{sn}$, a PMSG and the STATCOM are modeled as negative-sequence admittance $Y_{gxn}$ (x=1, 2, 3 ... m) and $Y_{stn}$, respectively, a grid-connected three-winding transformer is also modeled as negative-sequence admittance, specifically, $Y_{t1n}$, $Y_{t2n}$, $Y_{t3n}$ are the equivalent negative-sequence admittance of the primary-winding, the secondary winding, and the tertiary winding, respectively, $Y_{eqn}$ is the equivalent negative-sequence admittance seen from Point of Common Coupling.

9. The method of claim 7, the negative-sequence reference can be calculated as, $$I_{dqrefxn}=(I_{dqxn}+V_{gdqn}Y_{bn})k_x$$

wherein $Y_{bn}$ is a known constant, here $Y_{bn}=8$, $k_x$ is a participation factor of the wind turbines (e.g., x=1, 2, ... m) or the STATCOM (e.g., x=st), $I_{dqxn}$ and $I_{dqrefxn}$ are the measured and the reference negative-sequence current, respectively; $V_{gdqn}$ is the d-q components of negative-sequence voltage at the Point of Common Coupling.

10. The method of claim 9, the $k_x$ should be limited within 0~1.

11. The method of claim 7, further comprising participation factor calculation for wind turbines, wherein a voltage unbalance factor controller and a remaining capacity calculation block are required;

wherein the voltage unbalance factor reference is set to 2%; and wherein a low pass filter is chosen to remove a double-frequency components of an output power in the remaining capacity calculation block.

12. The method of claim 11, further comprising a coordinated control strategy of the CHB-STATCOM and the wind turbines, and which comprising, Step 1: If the voltage unbalance factor at Point of Common Coupling is larger than 2%, then CHB-STATCOM will inject negative-sequence current to suppress the unbalanced voltage at the Point of Common Coupling as much as it can;

Step 2: If voltage unbalance factor at Point of Common Coupling is still larger than 2%, and then the participation factor of CHB-STATCOM is equal to 1;

Step 3: According to the voltage unbalance factor, and the output power of all wind turbines, calculating the participation factors for all wind turbines;

Step 4: Calculating the negative-sequence current reference for all wind turbines.

\* \* \* \* \*